PROCESS FOR PREPARING LITHIUM ALUMINUM HYDRIDE

Gottfried J. Brendel, Baton Rouge, La., assignor to Ethyl Corporation, New York, N.Y., a corporation of Virginia
No Drawing. Filed Nov. 29, 1961, Ser. No. 155,853
2 Claims. (Cl. 23—365)

This invention relates to the manufacture of lithium aluminum hydride. More particularly, the invention relates to a new and improved process whereby lithium aluminum hydride is generated in high and reproducible yields and is readily thereafter recoverable in a high quality crystalline form.

It has been shown, prior to the present invention, that lithium aluminum hydride can be manufactured by the reaction of lithium chloride and sodium aluminum hydride in certain liquid reaction media, according to the following equation:

$$NaAlH_4 + LiCl \rightarrow LiAlH_4 + NaCl$$

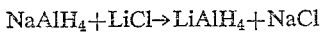

While this reaction has been shown to be fully effective, in actual performance of the reaction, the results have been frequently uncertain. In other words the rate of reaction has been quite variable. In some instances, yields have been very low and the process has therefore been inefficient. In other cases, an appreciable lag has existed before reaction has started. Because of these problems, a need has existed for a reproducible process providing high yields.

The principal object of the present invention is to provide a new and improved process for making lithium aluminum hydride in high yields with relatively brief reaction periods. Another object of preferred embodiments is to provide a process wherein reaction between sodium aluminum hydride and lithium chloride is very promptly initiated, without an undue lag or induction period. An additional object is to provide a process from which the product is readily recovered as a high grade, relatively uniform crystalline product. A particular object of a highly preferred embodiment is to provide an integrated synthesis and recovery process utilizing a particular form of feed material, including a component which performs a dual function in said embodiment. Other objects will appear hereinafter.

The process in its most general form involves reacting together, in approximately equimolal proportions, lithium chloride and sodium aluminum hydride, in a reaction medium consisting predominantly of diethyl ether. The sodium aluminum hydride must be in active or surface active state, and various methods of providing such an active state are described herein. In particular preferred embodiments, the reaction is also initiated or promoted by providing a small amount of previously formed lithium aluminum hydride.

In carrying out the process, the reactants are employed in stoichiometric or almost stoichiometric proportions. Normally the proportions will always be fed in a molal ratio of from 0.95 to 1.05 moles of lithium chloride per mole of sodium aluminum hydride, the preferred range being from 0.98 to 1.00 mole of lithium chloride.

The temperature of operation is important, but considerable latitude exists. Generally, the process is a low temperature operation, that is, the most efficient temperatures are appreciably lower than expected. In fact, it is found that the speed of reaction as well as the ultimate yields obtained, are favored by lower temperatures. Permissible temperatures range from 0° to 80° C., a preferred range of temperatures being from 10 to 50° C., and an even more highly preferred range being from about 20 to about 35° C.

As already stated, the reaction is carried out in a dry liquid reaction medium consisting essentially of diethyl ether, normally also containing 5 to 10 volume percent toluene. In certain preferred embodiments, the reaction system also includes a small quantity of a liquid aromatic hydrocarbon, most commonly toluene, which is present as a component to assure the activity or retention of activity of the sodium aluminum hydride, and, further, contributes to the efficacy of the recovery operations. Customarily, components such as toluene do not exceed about 10 volume percent of the diethyl ether, but proportions as high as 20 volume percent can be tolerated.

The diethyl ether is employed in proportions providing an initial proportion of from about 2.5 to 5, or slightly higher gram moles of sodium aluminum hydrides per liter of ether. The sodium aluminum hydride is substantially insoluble in the diethyl ether, but the lithium chloride is only slightly soluble. The proportions of diethyl ether above stated assure the separation of a solution of high purity lithium aluminum hydride product from the solid sodium chloride by-product of the reaction. The diethyl ether also greatly facilitates the subsequent crystallization of a high quality crystalline lithium aluminum hydride product.

As already indicated, the efficacy of the reaction depends greatly on a supply of surface active sodium aluminum hydride, that is a reactant which is capable of promptly initiating or participating in the desired reaction and producing a high yield of lithium aluminum hydride. Several methods are available for providing this essential condition. The most favored procedure involves preserving the sodium aluminum hydride under a protective layer or coating of the liquid reaction medium in which it is synthesized. This should be a relatively high boiling aromatic liquid such as toluene. A highly preferred method for the manufacture of the sodium aluminum hydride involves the pressure hydrogenation of subdivided aluminum and sodium, or sodium hydride, in a reaction medium of toluene. For the preferred feed for the present process, such toluene reaction medium is removed only in part, so that the sodium aluminum hydride is never exposed to a gaseous atmosphere, even of a gas which is normally considered fully inert, such as nitrogen, Alternatively, as an adjunct to the synthesis of sodium aluminum hydride, a washing procedure is provided in which the crude material is washed with fresh toluene, and the product so refined is kept wet with the washing liquid.

In some cases the available sodium aluminum hydride has lost its activity by being completely freed or dried of the reaction medium in which it was prepared or of the washing liquor. In such instances, the active characters can be re-established by subjecting the inactive material to severe attrition or grinding in the presence of a small amount of inert liquid such as toluene. For example, inactive sodium aluminum hydride can be ball milled for an hour or so in the presence of dry toluene, sufficient to fully cover the solids, and it is then substantially equivalent in activity to freshly synthesized material which has been retained with a coating or covering of liquid reaction medium.

The use of a small amount of previously prepared lithium aluminum hydride, in proportions of about 0.1 to 1.0 mole percent, based on the sodium aluminum hydride charged, is found to be particularly advantageous, in initiating reaction and in obtaining high yields.

The details of the process are more fully illustrated by the working examples given below.

Example 1

To a Magne-Dash reactor was charged 100 ml. of diethyl ether, 0.30 gram-mole of sodium aluminum hydride and 0.30 gram-mole of lithium chloride. In addition 50 milligrams of previously prepared lithium aluminum hydride, or 0.4 mole percent, based on the sodium hydride, was charged.

The sodium aluminum hydride had been synthesized by pressure hydrogenation of subdivided aluminum and sodium in a toluene reaction medium, and was damp or coated with unremoved toluene. This sodium aluminum hydride component had a purity of about 97 percent. The lithium chloride had a purity of over 99 percent, and was previously dried under vacuum at about 100° C.

After charging the reactor, under an inert gas atmosphere, the reactor was closed, and agitation was started while maintaining a temperature of 25° C. Reaction was continued for three hours. At the termination of this period, analysis of an aliquot of the liquid phase of the reacted mixture showed a yield of 95 percent of lithium aluminum hydride, $LiAlH_4$.

Crystalline lithium aluminum hydride is readily recoverable from the product solution as high purity crystals, by adding a liquid which is higher boiling, but miscible with the diethyl ether but a non-solvent for the lithium aluminum hydride. The diethyl ether is then evaporated off, at least in part, and the lithium aluminum hydride precipitated as a crystal crop. Thus, after filtering out the sodium chloride solids from the reacted mixture of the foregoing example, the liquid phase is mixed with an approxmiately equal amount of toluene, and distillation is carried out at about one-fourth atmosphere pressure, until the distillate is equal in volume to the original solution. This provides a crop of needle-like crystals, amounting to 85–90 percent of the original lithium hydride content.

Example 2

When the synthesis procedure for the lithium aluminum hydride, of the above example, is repeated, except that the reaction is carried out at 50° C., the yield is reduced to 79 percent.

Examples 3–5

A series of additional operations were carried out at different temperatures, with the following results:

| Example | Operation Temperature, °C. | LiAlH$_4$ Yield, Percent |
| --- | --- | --- |
| 3 | 0 | 74 |
| 4 | 65 | 70 |
| 5 | 75 | 52 |

In these examples, the feed materials were the same as in Examples 1 and 2, except that in Examples 4 and 5, the sodium aluminum hydride had been freed entirely of the toluene employed in its preparation and was a dry powder. Such material, not having its full activity retained by a protective film or layer of toluene, produces yields approximately 10 percent below the yield experienced with fully active sodium aluminum hydride.

When fully active sodium aluminum hydride is substituted in Examples 4 and 5, yields of about 80 and 60 percent are achieved. From the foregoing examples it is seen that the best yields are, surprisingly, obtained at the relatively low temperatures of about 20–35° C.

As previously mentioned, the quality of the sodium aluminum hydride, if it has been rendered partly inactive by exposure, can be restored by mechanical attrition in the presence of an inert solvent, as shown by the following example.

Example 6

In this operation, the sodium aluminum hydride was originally a dry material, i.e. the solvent used in its preparation had been removed by heating under vacuum. The material was then ball-milled for under an hour in the presence of a blanket of dry toluene, in proportions of about 3–7 ml. per gram of the sodium aluminum hydride. After the ball milling, the mixture was filtered free of excess toluene, leaving a cake of finely divided sodium aluminum hydride, wet with the toluene in proportions of about 15 weight percent. Upon reacting this material, as in Example 1, a comparable yield of lithium aluminum hydride was obtained. In brief, the grinding or ball milling, in the presence of toluene, restores the activity of the sodium aluminum hydride.

As previously mentioned the present process is particularly attractive in that it facilitates the recovery of lithium aluminum hydride in crystalline form, as in Example 1. The recovery technique also lends itself to cyclic operation providing particular economy of materials, as described in the following example.

Example 7

Example 1 is repeated, and the recovery by addition of toluene and vaporizing to crystallize, is again carried out. The overhead from the crystallization-distillation contains from 5 to 10 percent toluene in the diethyl ether. This overhead, with a small amount of make-up diethyl ether, is used as the reaction medium for a second or succeeding synthesis cycle.

The bottoms from the flash crystallization, including the crystallized lithium aluminum hydride and the mother liquor, is filtered. The crystalline product separated was washed with toluene and petroleum ether and dried under vacuum. The filtrate, containing toluene and a small amount of diethyl ether, is used as the additive for the flash-crystallization product recovery from the second synthesis step.

The foregoing sequence of operations is continued for a large number of synthesis and recovery cycles, so that the diethyl ether for synthesis, and the toluene used in the crystallizing step is conserved, only small amounts of make up being required. In the most preferred embodiments, the sodium aluminum hydride is accompanied, from the synthesis step, by toluene in proportions to compensate for the losses in the crystallizing operation. It has been found that toluene, in proportions up to about 10 to 20 volume percent of the diethyl ether, does not adversely effect the efficiency of the synthesis operation, providing that the amount of diethyl ether provided to the synthesis step is maintained at the level previously described, i.e., in proportions providing initial sodium aluminum hydride ratios of about 2.5 to 5 gram moles per liter of pure diethyl ether.

As previously shown, in the preferred forms of the process, the provision of a small amount of previously prepared lithium aluminum hydride is highly beneficial in assuring prompt initiation and good yields. The benefits of this step are further illustrated by the following example.

Example 8

The synthesis procedure of Example 1 was repeated, using a different batch of sodium aluminum hydride, but with no lithium aluminum hydride initially added. In carrying out the synthesis reaction at 35° C. for 3 hours, no lithium aluminum hydride was formed. Upon repeating the operation with the same materials and about 1 mole percent of lithium aluminum hydride added, the conversion was 73 percent in a 3 hour reaction time at 35° C.

In all the examples given above, the sodium aluminum hydride and lithium chloride feed materials were relatively finely divided solids. The particle sizes of the reactants is not, however, particularly critical. As already stated, neither of these reactants is soluble to any extent in the reaction medium, so that a particular degree of subdivision is not required to accomplish a particular rate of solution.

A particular benefit of the process is the relative rapidity. A residence time of at least one-half hour, and up to about five hours, is employed. Residence times greater than this range are not particularly beneficial, and, in fact, particularly when higher temperatures are employed, longer residence times actually depress the conversion or yield.

Most effective operation is conditioned on providing vigorous agitation in the synthesis step. Various types of commercially available agitation systems can be used.

Toluene is the preferred inert liquid employed to accompany the sodium aluminum hydride feed, but other hydrocarbons can also be used with good results. However, toluene as a component provides the particular advantage of being particularly suitable as the medium or synthesis of the sodium aluminum hydride, as a preservative of the active character of the sodium aluminum hydride, and as a component in the subsequent vaporizing-crystallizing recovery of the crystalline lithium aluminum hydride product. When desired, other aromatic or aliphatic liquid hydrocarbons can be substituted for the toluene. Such hydrocarbons should have a relatively high boiling point, to facilitate the vaporizing-crystallizing recovery. Illustrative of such substitutes are benzene, n-hexane, and the dimethyl pentanes and hexanes.

I claim:
1. A process for making lithium aluminum hydride comprising feeding together lithium chloride and surface active sodium aluminum hydride in approximately equimolal proportions, a minor amount of preformed lithium aluminum hydride as a reaction initiator and a reaction medium essentially consisting of diethyl ether and from about 5 to 20 volume percent of an inert high boiling liquid hydrocarbon, the sodium aluminum hydride being in the proportions of 2.5 to 5 gram moles per liter of ether, and reacting at a temperaure of 0 to 80° C. for a reaction period of one-half to five hours.

2. A cyclic process of making lithium aluminum hydride comprising feeding together surface active sodium aluminum hydride with toluene, lithium chloride, and lithium aluminum hydride, and a reaction medium consisting essentially of diethyl ether having from about 5 to about 20 volume percent toluene therein and being a recycle stream as hereafter defined, the sodium aluminum hydride being in the proportions of from 2.5 to 5 gram moles per liter of the ether, the lithium chloride being in the proportions of 0.95 to 1.05 moles per mole of the sodium aluminum hydride, and the lithium aluminum hydride being in the proportions of about 0.1 to 1.0 mole percent of the sodium aluminum hydride, and reacting for a period of up to about 3 hours, at a temperature of about 20 to 35° C., thereby forming a solution of lithium aluminum hydride and solids including sodium chloride, and separating the solids and the liquid, then adding additional toluene to the liquid phase, and vaporizing sufficient of the liquid phase so-formed to crystallize lithium aluminum hydride, separating the so-formed lithium hydride, and recovering the vaporized liquid for use as the reaction medium in a succeeding cycle.

References Cited

UNITED STATES PATENTS

| | | | |
|---|---|---|---|
| 3,112,989 | 10/1963 | Banus | 23—365 |
| 3,162,508 | 12/1964 | Bragdon et al. | 23—365 |
| 3,180,700 | 4/1965 | Robinson | 23—365 |
| 3,222,120 | 12/1965 | DelGuidice | 23—364 X |

OTHER REFERENCES

Clasen—"Angewandte Chemie"—vol., 73, pp. 322–331 (May 21, 1961).

MILTON WEISSMAN, *Primary Examiner.*

MAURICE A. BRINDISI, *Examiner.*